(12) United States Patent
Beckman

(10) Patent No.: US 7,667,137 B1
(45) Date of Patent: Feb. 23, 2010

(54) BRACKET FOR MOUNTING AN ELECTRICAL OUTLET BOX

(76) Inventor: Donald Beckman, 71 Thomas Ave., #5, Brisbane, CA (US) 94005

( * ) Notice: Subject to any disclaimer, the term of this patent is extended or adjusted under 35 U.S.C. 154(b) by 0 days.

(21) Appl. No.: 12/082,774

(22) Filed: Apr. 14, 2008

(51) Int. Cl.
*H01H 9/02* (2006.01)

(52) U.S. Cl. .............................. 174/58; 174/57; 174/60; 174/61; 174/135; 248/502.1; 248/343; 52/317

(58) Field of Classification Search ............... 174/57, 174/58, 60, 61, 135; 220/3.9; 248/343, 300, 248/205.1, 544, 906; 52/317
See application file for complete search history.

(56) References Cited

U.S. PATENT DOCUMENTS

| | | | |
|---|---|---|---|
| 3,928,716 A | * | 12/1975 | Marrero ........................ 174/57 |
| 6,484,980 B2 | | 11/2002 | Medlin et al. |
| 7,025,314 B1 | | 4/2006 | Thomas et al. |
| 7,053,300 B2 | | 5/2006 | Denier et al. |
| 7,073,757 B2 | | 7/2006 | Johnson et al. |
| 2003/0029983 A1 | | 2/2003 | Pfaller |
| 2004/0222006 A1 | | 11/2004 | Gerardo |
| 2005/0067180 A1 | | 3/2005 | Dinh |
| 2005/0067546 A1 | | 3/2005 | Dinh |

* cited by examiner

*Primary Examiner*—Dhiru R Patel
(74) *Attorney, Agent, or Firm*—Mark Levy; Hinman, Howard & Kattell

(57) ABSTRACT

A bracket for mounting an electrical outlet box on studs. A longitudinal strip is provided with a first end and a second end. The strip has a first double 90° bend offset which is located a first predetermined distance from the first end. A second double 90° bend is offset a second predetermined distance from the second end of the strip. A bendable planar sheet extends from the longitudinal strip and has a main body and a protrusion formed at its distal end.

18 Claims, 3 Drawing Sheets

BRACKET FOR MOUNTING AN ELECTRICAL OUTLET BOX

FIELD OF THE INVENTION

The present invention relates to electrical outlet boxes and, more particularly, to a bracket bendable in the field for mounting an electrical outlet box on studs.

BACKGROUND OF THE INVENTION

In the construction industry, particularly in commercial construction, improvements which increase worker productivity, decrease the time to complete a project, and improve job quality are highly desirable. Presently, contractors and builders endeavor to reduce labor costs by simplifying on-site assembly and wiring as much as possible. Particularly in commercial construction, where union labor is expensive and there are tight deadlines, the use of pre-wired electrical outlet boxes and subsystems are growing in popularity.

In many instances electrical contractors work with pre-made factory brackets that have ears. Normally, an electrical contractor works with separate individual elongated brackets for mounting/housing an electrical box. This forces an electrical contractor to waste time situating the correct number and sizes of brackets to secure each electrical box. It is desirable in such situations to have a bracket that is easily manipulated to house and mount the particular electrical box.

Since it is impossible to determine how many brackets are needed for an installation of an electrical box, there can be shortages during the installation process or an excess of unused brackets upon finishing the job. It is therefore desirable to have brackets that can accommodate varying sizes and styles of electrical boxes. This, in turn, facilitates the installation process by saving the contractor time, money, and space.

A variety of brackets has been created to mount an electrical box, thereby overcoming the aforementioned disadvantages. However, none of the attempts discloses the features of the present invention.

DISCUSSION OF RELATED ART

U.S. Pat. No. 6,484,980 for FIELD BENDABLE TAB FOR ELECTRICAL BOX SUPPORT, granted to Medlin, Sr. et al. on Nov. 26, 2006 shows an electrical box support having either a single strut accommodating a constant stud spacing or a set of struts telescoping one within the other to accommodate the length for attachment to adjacent studs of different spacings. Each strut has a face suited for mounting an electrical box. An end tab formed at each of outer opposite ends of the support is adapted for bending in the field so as to be able to mount an electrical box appropriately matching the surface of a wall board to be installed. Bending of the tab along a controlled straight line is accomplished by the formation of discontinuous score lines formed along each of several bend lines and which permit, when necessary, the end tab to be straightened and re-bent without fracturing the metal forming the end tab.

U.S. Pat. No. 7,025,314 for MULTI-FUNCTIONAL MOUNTING BRACKET WITH INTEGRAL ELECTRICAL BOX, granted to Thomas et al. on Apr. 11, 2006 shows a multi-functional mounting bracket comprising an integral electrical box obviating the need to mount the electrical box to the mounting bracket at the construction site. The Thomas mounting bracket can be attached to metal or wooden studs without the need for modification.

U.S. Pat. No. 7,053,300 for MULTI-FUNCTIONAL ELECTRIC SUPPORT BRACKET, granted to Denier et al. on May 30, 2006 shows a multi-purpose bracket for supporting electric boxes in a stud wall which can be attached directly to a stud, between two adjacent studs, or supported from the floor. The mounting bracket includes four tabs that are adapted to attach to a vertically slotted base unit. Further, the bracket includes a cable support having an edge which aligns with a stabilizing leg of the bracket which allows it to align itself to a metal stud. An edge of the bracket is then screwed to the metal stud. The bracket includes channels which receive straps which can be used to support the bracket between two adjacent studs without use of the floor support.

U.S. Pat. No. 7,073,757 for ADJUSTABLE BRACKET FOR SECURING AN ELECTRICAL BOX TO A STUD, granted to Johnson et al. on Jul. 11, 2006 shows an electrical box bracket with an adjustable member to facilitate securing the bracket to supports of varying sizes. The bracket has first and second legs that are connected by a third leg. A cut-out extends from the first leg onto the third leg. The adjustable member is formed by the cut-out to facilitate securing the bracket to the support. A centerline on the third leg of the bracket is adapted to be aligned with corresponding indicia on the support. The support indicia is visible through the cut-out to facilitate positioning the bracket on the support. A plurality of weld projections on the second leg facilitates securing a variety of different electrical boxes to the electrical box bracket.

United States Published Patent Application No. 2003/0029983 for BAR HANGER AND MOUNTING CLIP ASSEMBLY, on application by Mark J. Pfaller discloses a bar hanger and mounting clip assembly for securing an electrical box between two opposed Tee bar elements in a ceiling structure. A spanning bar spans between the two opposed Tee bar elements. First and second clips are disposed at opposed ends of the spanning bar for attaching the spanning bar to the two opposed Tee bar elements. An electrical box and a mounting clip for securing the electrical box to the spanning bar are provided. The mounting clip includes a tension leg for initially holding the electrical box in position on the spanning bar before the clip is securely fastened to the electrical box.

United States Published Patent Application No. 2004/0222006 for ADJUSTABLE FLOOR BRACKET ARTICLE AND METHOD, on application of Joseph R. Gerardo discloses a support bracket article for enabling the adjustable positioning of an electrical box enclosure relative to the bottom of a framing member, and the supporting thereof in an interior wall section of a wall system under construction. The article is able to guide the adjustable positioning of the electrical box enclosure and is also able to accommodate the supporting and adjustable positioning of the electrical box enclosure in a variety of framing studs and wall systems.

United States Published Patent Application No. 2005/0067546 for MOUNTING BRACKET FOR AN ELECTRICAL BOX, on application of Cong Dinh discloses an apparatus for mounting an electrical box within a wall cavity of a building. The wall cavity is defined by a plurality of wall supports. The apparatus consists of an elongated bracket having first and second mounting regions thereof and also configured to support an electrical box therefrom. At least the first mounting region is configured to be supported from a first wall support. An elongated bar is removably secured to the bracket with this bar being configured to secure the second mounting region of the bracket to a second wall support.

United States Published Patent Application No. 2005/0067180, COMBINATION MOUNTING BRACKET AND ADAPTER PLATE FOR MOUNTING ELECTRICAL BOXES, also on application of Cong Dinh discloses a mounting system for securing an electrical box within a wall of a building. The electrical box is of typical construction having an open side thereof. The mounting system consists of an elongated bracket having one end region secured to the wall structure and a generally rectangular opening therein sized to permit access to the open side of the electrical box. An adapter plate is mounted to the bracket with this adapter plate having a central opening that is also sized to permit access to the open side of the electrical box. The adapter plate is further configured with a box mounting structure to secure the electrical box to the adapter plate.

SUMMARY OF THE INVENTION

In accordance with the present invention, there is provided a bracket for mounting an electrical outlet box on studs. A longitudinal strip is provided with a first end and a second end. The strip has a first double 90° bend offset which is located a first predetermined distance from the first end. A second double 90°, bend is offset a second predetermined distance from the second end of the strip. A bendable planar sheet extends from the longitudinal strip and has a main body and a protrusion formed at its distal end.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

The present invention is a bracket for mounting an electrical outlet box on studs. Certain 90° bends are made at the factory, while others can be made in the field.

Figure 1:
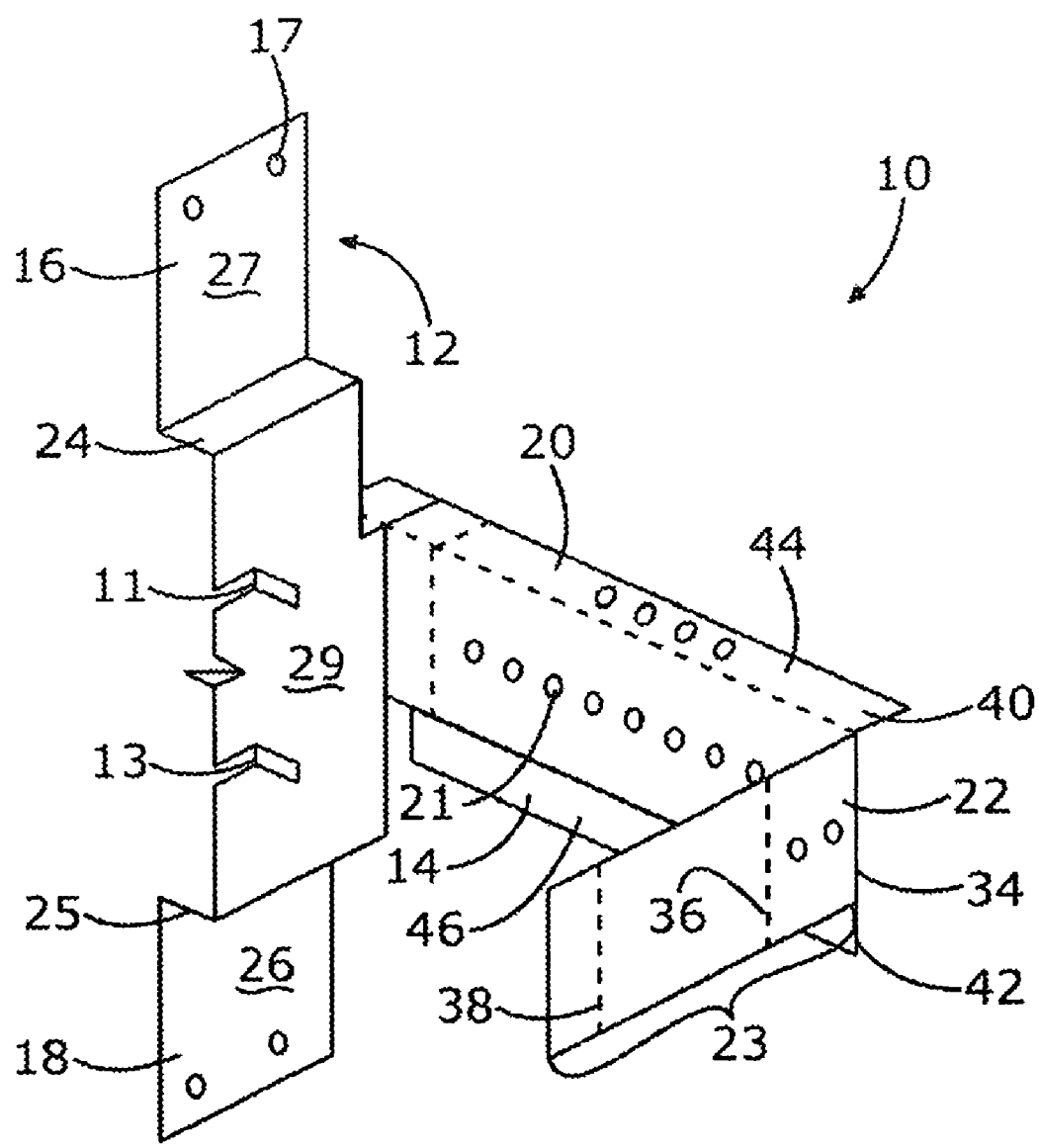
FIG. 1 is a perspective view of the bracket in accordance with the present invention.

Referring now to FIG. 1, there is shown a perspective view of the inventive bracket 10. A longitudinal strip 12 is provided with a first end 16 and a second end 18. On first end 16 and second end 18 of strip 12 are respective 90° factory bend 24 and 90° factory bend 25 in the opposite direction that creates a raised platform 29 and lowered areas 27 and 26 at ends 16 and 18 respectively. On longitudinal strip 12 are two tabs 11, 13 between factory bends 24, 25 that are bendable by the user to form a 90° angle to the major plane of strip 12. Tabs 11, 13 are bendable to 90° to penetrate existing holes in box 60 and then further bent to 180° to secure box 60 (FIG. 3) to bracket 10.

Figure 2:
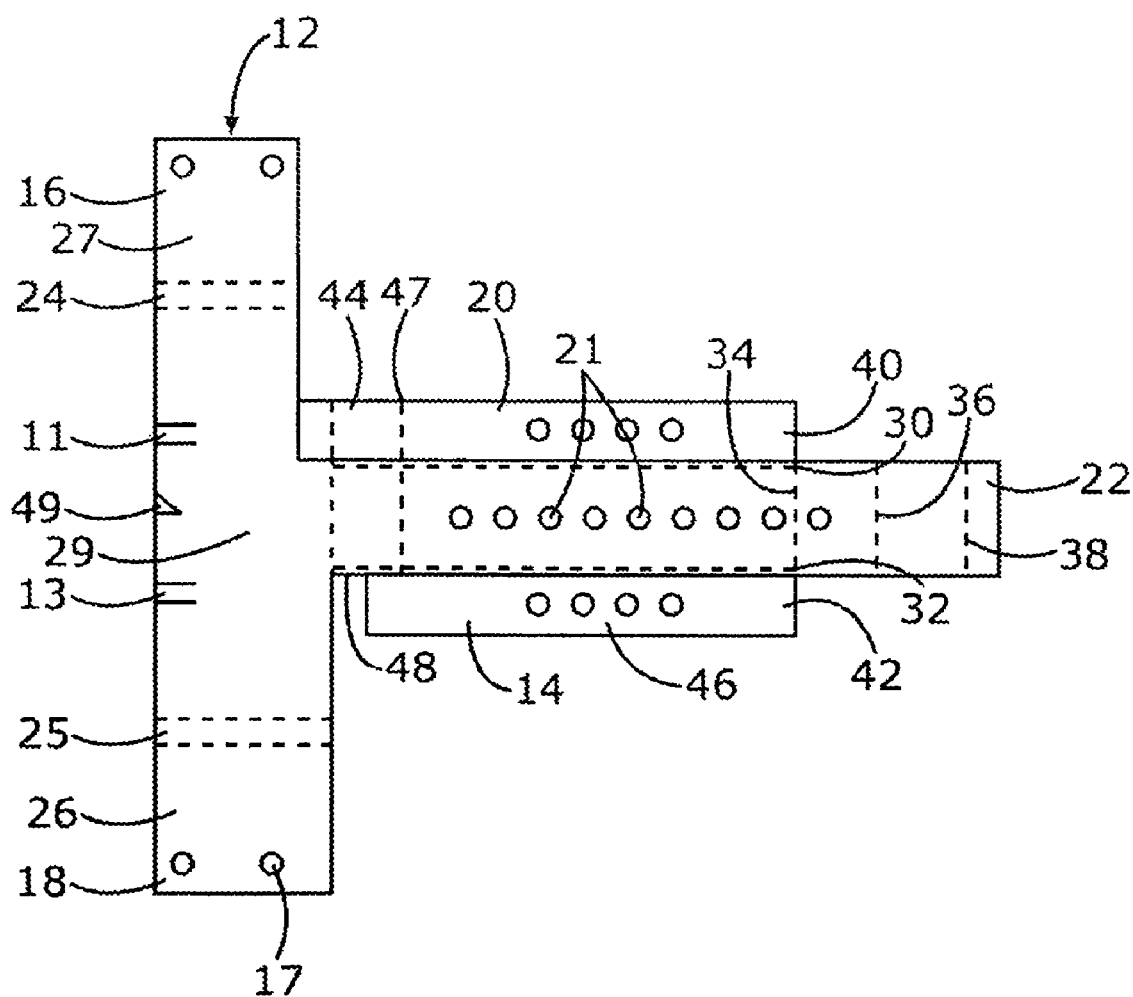
FIG. 2 is a side plan view of the bracket shown in FIG. 1.

A bendable planar sheet 14 extends perpendicularly from strip 12 and has an L-shaped main body 20 and a distal end 22 forming a protrusion 23. Scoring lines 30 and 32 (FIG. 2) are field-bendable to form a 90° angle to the major plane of main body 20. Main body 20 has three bends, 34, 36 and 38, which are usable in the field. Main body 20 also comprises field usable bends 47 and 48 (FIG. 2). Two of lines 34, 36, 38, 47, 48 are used, determined by the width and depth of the electrical box 60 (FIG. 3).

On planar sheet 14, bendable tabs 40 and 42 are perpendicular to the major plane of longitudinal strip 12. As a means of supporting the electrical box 60 (FIG. 3), parallel flaps 44, 46 are bendable to be perpendicular to main body 20. Only one flap 44 or 46 is bent 90°, determined by the depth of the electrical box 60 used. On main body 20 is disposed an array of holes 21 to provide alternate placement of a ground screw, not shown.

Referring to FIG. 2, there is shown a side plan view of the bracket 10 as manufactured. The level difference can be seen on longitudinal strip 12. Planar sheet 14 is shown with distal portion 22. On main body 20, bendable flaps 44, 46 are parallel to the main axis of longitudinal strip 12. As aforementioned, only one flap 44 or 46 is bent 90°, determined by the depth of the electrical box 60 used. Tab 49 is factory bent to mark the center line of the bracket 10 and electrical box 60 (FIG. 3).

Figure 3:
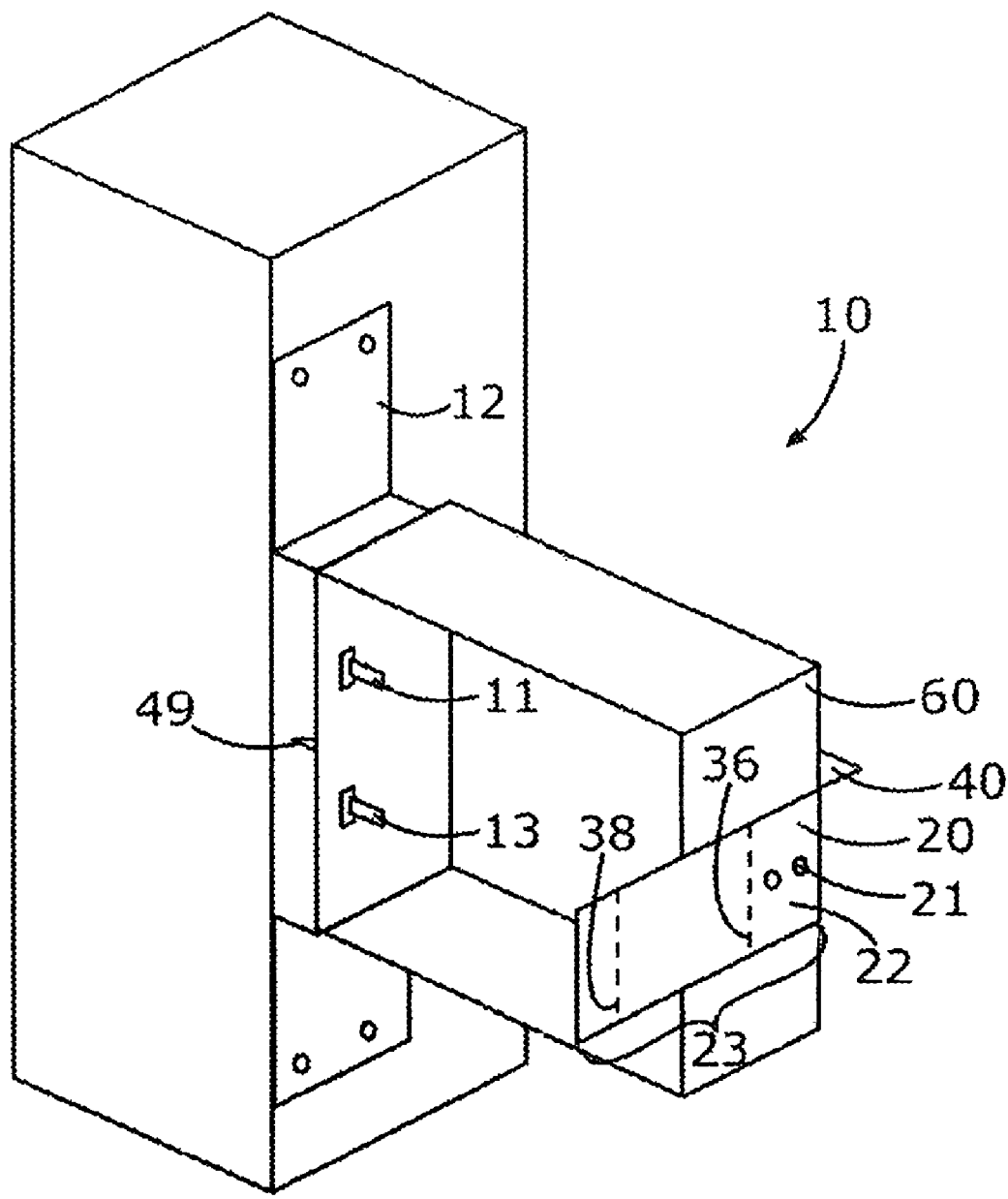
FIG. 3 is a perspective view of the inventive bracket shown in situ with an electrical outlet box.

Referring to FIG. 3, there is shown in situ the inventive bracket 10 mounting an electrical box 60, shown for illustrative purposes only and not part of the present invention. Electrical box 60 is proximate longitudinal strip 12 and is secured with bendable tabs 28. Electrical box 60 is also proximate distal end 22 of planar sheet 14. The length of planar sheet 14 is suitable to retain the longest side of electrical box 60 by being bent in the field therearound. Likewise 90° factory bends 24 and 25 (FIG. 1) allow electrical box 60 to be elevated from the point on a stud where box 60 is to be secured. Distal ends 16, 18 present mounting points 17 for bracket 10 to be secured on its intended mark. Tabs 40, 42 become a third point of contact with a mounting stud at the rear of the electrical box 60 to keep the box front in the same plane as the stud front.

Since other modifications and changes varied to fit particular operating requirements and environments will be apparent to those skilled in the art, this invention is not considered limited to the examples chosen for purposes of this disclosure, and covers all changes and modifications which does not constitute departures from the true spirit and scope of this invention.

Having thus described the invention, what is desired to be protected by Letters Patent is presented in the subsequently appended claims.

What is claimed is:

1. A bracket for mounting an electrical outlet box on studs, the bracket comprising:
    a) a longitudinal strip having a first end and a second end, said strip having a first double ninety degree bend offset a first predetermined distance from said first end and a second double ninety degree bend offset a second predetermined distance from said second end; and
    b) a bendable planar sheet extending perpendicularly from said longitudinal strip and having a main body and a permanently attached protrusion formed at the distal end thereof.

2. The bracket for mounting an electrical outlet box on studs in accordance with claim 1, further comprising:
    c) at least one tab disposed between said each of said double ninety degree bends, said at least one tab being bendable in the field by a user.

3. The bracket for mounting an electrical outlet box on studs in accordance with claim 2, wherein said protrusion comprises means for forming a ninety degree bend at least one location thereof.

4. The bracket for mounting an electrical outlet box on studs in accordance with claim 3, wherein said protrusion comprises means for forming a ninety degree bend at three locations thereof.

5. The bracket for mounting an electrical outlet box on studs in accordance with claim 2, further comprising:

d) an array of apertures formed in said main body for accommodating a ground screw.

6. The bracket for mounting an electrical outlet box on studs in accordance with claim 1, wherein said protrusion comprises means for forming a ninety degree bend at least one location thereof.

7. The bracket for mounting an electrical outlet box on studs in accordance with claim 6, wherein said protrusion comprises means for forming a ninety degree bend at three locations thereof.

8. The bracket for mounting an electrical outlet box on studs in accordance with claim 6, further comprising:
   c) an array of apertures formed in said main body for accommodating a ground screw.

9. The bracket for mounting an electrical outlet box on studs in accordance with claim 1, further comprising:
   c) an array of apertures formed in said main body for accommodating a ground screw.

10. A bracket for mounting an electrical outlet box on studs, the bracket comprising:
    a) a longitudinal strip having a first end and a second end, said strip having a first double ninety degree bend offset a first predetermined distance from said first end and a second double ninety degree bend offset a second predetermined distance from said second end; and
    b) a bendable planar sheet extending perpendicularly from said longitudinal strip and having a permanently attached protrusion orthogonally positioned relative thereto.

11. The bracket for mounting an electrical outlet box on studs in accordance with claim 10, further comprising:
    c) at least one tab disposed between said each of said double ninety degree bends, said at least one tab being bendable in the field by a user.

12. The bracket for mounting an electrical outlet box on studs in accordance with claim 11, wherein said protrusion comprises means for forming a ninety degree bend at least one location thereof.

13. The bracket for mounting an electrical outlet box on studs in accordance with claim 12, wherein said protrusion comprises means for forming a ninety degree bend at three locations thereof.

14. The bracket for mounting an electrical outlet box on studs in accordance with claim 11, further comprising:
    d) an array of apertures formed in said main body for accommodating a ground screw.

15. The bracket for mounting an electrical outlet box on studs in accordance with claim 10, wherein said protrusion comprises means for forming a ninety degree bend at least one location thereof.

16. The bracket for mounting an electrical outlet box on studs in accordance with claim 15, wherein said protrusion comprises means for forming a ninety degree bend at three locations thereof.

17. The bracket for mounting an electrical outlet box on studs in accordance with claim 15, further comprising:
    c) an array of apertures formed in said main body for accommodating a ground screw.

18. The bracket for mounting an electrical outlet box on studs in accordance with claim 10, further comprising:
    c) an array of apertures formed in said main body for accommodating a ground screw.

* * * * *